(12) United States Patent
Virkar et al.

(10) Patent No.: US 6,632,763 B2
(45) Date of Patent: Oct. 14, 2003

(54) ALKALI-METAL-BETA-AND BETA"-ALUMINA AND GALLATE POLYCRYSTALLINE CERAMICS AND FABRICATION BY A VAPOR PHASE METHOD

(75) Inventors: Anil Vasudeo Virkar, Salt Lake City, UT (US); Jan-Fong Jue, Salt Lake City, UT (US); Kuan-Zong Fung, Salt Lake City, UT (US)

(73) Assignee: Materials and Systems Research, Inc., Salt Lake City, UT (US)

( * ) Notice: Subject to any disclaimer, the term of this patent is extended or adjusted under 35 U.S.C. 154(b) by 0 days.

(21) Appl. No.: 10/308,652

(22) Filed: Dec. 2, 2002

(65) Prior Publication Data

US 2003/0087752 A1 May 8, 2003

Related U.S. Application Data

(63) Continuation of application No. 09/636,157, filed on Aug. 10, 2000, now Pat. No. 6,537,940, which is a continuation of application No. 09/002,483, filed on Jan. 2, 1998, now Pat. No. 6,117,807.

(51) Int. Cl.$^7$ .................. C04B 35/01; C04B 35/10; C04B 35/113
(52) U.S. Cl. .................. 501/153; 501/105; 501/126; 501/127; 501/152; 117/84; 428/689; 428/697; 429/321; 429/320; 429/304; 429/231.9; 429/231.95
(58) Field of Search .............. 501/153, 105, 501/126, 127, 152; 117/84; 428/689, 697; 429/321, 231.9, 231.95, 320, 304

(56) References Cited

U.S. PATENT DOCUMENTS

| | | | |
|---|---|---|---|
| 3,655,845 A | 4/1972 | Chiku | 264/82 |
| 3,707,589 A | 12/1972 | Chiku et al. | 264/82 |
| 4,263,381 A | 4/1981 | McEntire et al. | 264/82 |
| 4,294,898 A | 10/1981 | Hartstein | 429/193 |
| 4,358,516 A | 11/1982 | Lange | 501/153 |
| 5,137,853 A | 8/1992 | Ichikawa et al. | 501/153 |
| 5,415,127 A | 5/1995 | Nicholson et al. | 117/90 |
| 6,117,807 A | 9/2000 | Virkar | 501/153 |

OTHER PUBLICATIONS

Youngblood, et al., "Sintering Processes and Heat Treatment Schedules for Conductive, Lithia–Stablized $\beta Al_2O_3$", *Bull. AM. Ceram. Soc.*, 1997, 56, 206 (no month).

Battles, "Materials for Advanced High Temperature Secondary Batteries" *International Materials REviews*, 34, 1 (no date).

Aichun Tan, et al. "in "Formation and characterization of Na–$\beta$"–alumina single crystal films" *Solid State Ionics* 1993, 67 (no month).

Grosbie, et al. "Potassium Beta"–Alumina Membranes" *Journal of the American Ceramic Society*, 65, 187 (no date).

*Primary Examiner*—Michael Marcheschi
(74) *Attorney, Agent, or Firm*—James L. Sonntag; Parsons Behle & Latimer

(57) ABSTRACT

A ceramic composite containing alkali-metal-beta- or beta"-alumina and an oxygen-ion conductor is fabricated by converting alpha-alumina to alkali-metal-beta- or beta"-alumina. A ceramic composite with continuous phases of alpha-alumina and the oxygen-ion conducting ceramic, such as zirconia, is exposed to a vapor containing an alkali-metal oxide, such as an oxide of sodium or potassium. Alkali metal ions diffuse through alkali-metal-beta- or beta"-alumina converted from α-alumina and oxygen ions diffuse through the oxygen-ion conducting ceramic to a reaction front where alpha-alumina is converted to alkali-metal-beta- or beta"-alumina. A stabilizer for alkali-metal-beta"-alumina is preferably introduced into the α-alumina/oxygen-ion conductor composite or introduced into the vapor used to convert the alpha-alumina to an alkali-metal-beta"-alumina.

11 Claims, 13 Drawing Sheets

Figure 2  PRIOR-ART

PRIOR-ART

ALKALI-METAL-BETA-AND BETA"-ALUMINA AND GALLATE POLYCRYSTALLINE CERAMICS AND FABRICATION BY A VAPOR PHASE METHOD

RELATED APPLICATIONS

This application is a continuation of U.S. patent application Ser. No. 09/636,157, filed Aug. 10, 2000, which is a continuation of U.S. patent application Ser. No. 09/002,483, filed Jan. 2, 1998, now U.S. Pat. No. 6,117,807, issued Sep. 12, 2000, which are hereby incorporated by reference.

FIELD OF THE INVENTION

This invention relates to the formation of polycrystalline alkali-metal-beta- and beta"- alumina ceramics, particularly for use as electrolytes in sodium-sulfur batteries, alkali metal thermoelectric converters (AMTEC) and alkali metal sensors.

BACKGROUND OF THE INVENTION

One of the high-temperature secondary battery systems being investigated as a power source for electric vehicles is the sodium-sulfur battery. These batteries offer a high specific energy and high specific power, both of which are required for electric vehicles. These battery systems may also be potential energy storage devices for electric utilities, where long life and low cost are more important than high specific energy and high specific power.

In a sodium-sulfur cell, a liquid anode of metallic sodium and liquid cathode of sulfur or sodium polysulfide are separated by a polycrystalline ceramic electrolyte of either sodium beta- or beta"-$Al_2O_3$. The operating temperature is typically between 300 and 400° C. In this battery, sodium ions diffuse during discharge from the anode to the cathode by ionic conduction through the ceramic electrolyte. Usually the electrolyte is in the form of a tube with the liquid sodium anode in the interior of the tube. For high operating efficiency and low battery cost, it is essential that the conductivity of the electrolyte be as high as possible. For this reason, the preferred electrolyte is the sodium beta"-$Al_2O_3$, because of its higher ionic conductivity.

The ceramic electrolyte is usually manufactured by mixing powders of $Al_2O_3$ and $Na_2O$ (along with either $Li_2O$ and/or MgO for stabilizing the beta"- phase) in appropriate proportions forming a powder compact and subjecting the powder compact to any one of various sintering processes. Examples of these processes are disclosed in "Sintering Processes and Heat Treatment Schedules for Conductive, Lithia-Stabilized Beta"-$Al_2O_3$" by G. E. Youngblood, A. V. Virkar, W. R. Cannon, and R. S. Gordon: *Bull Am. Ceram. Soc.*, 1977, 56. 206, and "Materials for Advanced High Temperature Secondary Batteries" by J. E. Battles: *International Materials Reviews.*, 34. 1. In most sintering processes the formation of a grain boundary liquid phase is essential. The liquid phase formation can enhance the sintering kinetics, but results in a large grain size, which decreases the mechanical strength of the electrolyte. The liquid phase sintering also generates a residual $NaAlO_2$ phase along the grain boundaries. The phase can react with moisture and further reduce the mechanical integrity of the ceramic electrolyte.

In U.S. Pat. No. 5,415,127 to Nicholson et al. and in "Formation and characterization of Na-Beta"-alumina single crystal films" by Aichun Tan, Chu Kun Kuo and Patrick S. Nicholson: *Solid State Ionics* 1993, 67. 131 is disclosed a method for the formation of Na-Beta"-$Al_2O_3$ single crystal films. These films, because of their optical properties, have potential in solid-state lasers, holography, signal and image processing, phosphor chemistry, and other optical devices. The process comprises providing a single crystal substrate of alpha-alumina with an optically smooth surface parallel to a (001) crystal plane, and heating the substrate in the presence of a vapor containing $Na_2O$ to react with the alumina and a stabilizing ion, such as lithium. The polished surface is required to form a single crystal. Otherwise a polycrystalline material is formed. The alumina is converted to Na-beta"-$Al_2O_3$ as it reacts with sodium oxide from the vapor. After conversion to Na-beta"-$Al_2O_3$ on the surface, further conversion requires that the $Na_2O$ in the form of ions be transported through the already formed Na-beta"-$Al_2O_3$ and react with the alumina at a reaction interface. This provides a slow moving reaction front moving through the substrate. The kinetics of this process is rather sluggish. Disclosed is conversion of a 40 $\mu$m thickness at 1600° C. in one hour. To convert a 0.5 mm thick electrolyte plate or tube for a battery electrolyte, several hundred hours at $\geq$1450° C. would be required. This long time of formation materially adds processing and equipment costs to the fabrication. The limiting step is believed to be the diffusion of oxygen ions through the converted Na-beta"-alumina material, since the only species that exhibits high mobility in Na-beta"-alumina is the sodium ion. To convert alumina into Na-beta"-alumina, both sodium and oxygen are required, and the diffusion of oxygen through Na-beta"-alumina is very slow.

Materials analogous to Na-beta-alumina and Na-beta"-alumina also have been found to be useful in various processes. For example, in "Potassium Beta"-Alumina Membranes" G. M. Grosbie and G. J. Tennenhouse: *Journal of the American Ceramic Society*, 65, 187 is disclosed membranes of the potassium analogs, K-Beta-alumina and K-Beta"-alumina, that are made by ion-exchanging the sodium materials. These potassium materials have potassium-ion conductivity and may be used where the potassium-ion conductivity is required.

Sodium and potassium-beta-alumina and beta"-alumina materials are also used in applications other than for battery applications, such as for sodium heat engines (SHE) or in general alkali-metal thermoelectric converters (AMTEC). Because of the continuing interest in these and the above battery technologies, a method for quickly producing electrolytes and other shapes without the disadvantages of sintered shapes would be an advance in the art.

OBJECTS OF THE INVENTION

It is, therefore, an object of the invention to provide a method for forming alkali-metal-beta- and beta"-alumina and gallate materials that do not require sintering and that avoids the formation of increased grain size and of grain boundary liquid phase.

Another object of the invention is to provide a method for forming alkali-metal-beta- and beta"-alumina and gallate materials by diffusion wherein oxygen diffusion is accelerated and is not the limiting step.

Another object of the invention is to provide a method shortening the processing time in the formation alkali-metal-beta- and beta"-alumina and gallate products by diffusion.

Further objects of the invention will become evident in the description below.

BRIEF SUMMARY OF THE INVENTION

The present invention is a composition and method for forming for alkali-metal-beta- and beta"-alumina and gallate products. The method of the invention allows conversion of alpha-alumina into an alkali-metal-beta- or beta"-alumina at a rate which is ten to hundred times larger than diffusion methods as disclosed in the Nicholson et al. patent.

The invention also involves the production of alkali-metal-beta- or beta"-gallate from gallium oxide, $Ga_2O_3$. Gallium has an analogous chemistry to aluminum as it applies to the present invention and composites of the invention can be made from alpha-$Al_2O_3$ or $Ga_2O_3$, or mixtures thereof. Accordingly, it is understood that any disclosure of the present invention for the production of alkali-metal-beta- or beta"-alumina from alpha-alumina also applies to the production of alkali-metal-beta- or beta"-gallate from gallium oxide. Mixtures of alpha-$Al_2O_3$ and $Ga_2O_3$ in the initial precursor composite, in which case a mixture of alkali-metal-beta- or beta"-$Al_2O_3$ and alkali-metal-beta- or beta"-$Ga_2O_3$ is formed, usually as a solution of the two.

The method of the invention comprises making a composite of alpha-alumina and an oxygen-ion conductor, such as zirconia, and then exposing it to a vapor containing an alkali-metal oxide, preferably an oxide of potassium or sodium, more preferably an oxide of sodium. The alkali-metal-beta- or beta"-alumina may be of any of the alkali metals, including rubidium (Rb), cesium (Cs), and lithium (Li), but preferably sodium (Na) and potassium (K), more preferably sodium (Na).

The vapor may also contain one or more stabilizers to inhibit transformation of beta"-alumina to the beta-alumina. These include, but are not limited to MgO, $Li_2O$ and ZnO. Other suitable stabilizer for beta"-alumina or beta-alumina may also be added. Alternately, one or more stabilizers may be included in the formation of the alpha-alumina/oxygen-ion conductor composite.

The oxygen-ion conductor may be any suitable ceramic oxygen-ion-conducting material. Examples include, but are not limited to, known oxygen-ion conductors, such as zirconia and its various forms, e.g., yttria stabilized zirconia, rare-earth-oxide-doped zirconia, and scandia-doped zirconia, and ceria ceramics, e.g., rare-earth oxide doped ceria and alkaline-earth oxide doped ceria, stabilized hafnia, and thoria.

The alpha-alumina and oxygen-ion conductor are formed into a ceramic composite by any conventional method for green forming, such as, for example, pressing, extrusion, slip casting, injection molding, tape casting, and the like, followed by sintering or hot-pressing. The physical properties of the final product derive in large part from those of the initial ceramic composite. Accordingly, fabrication methods that produce high-strength, fine-grained materials are preferred.

Both, alpha-alumina and the oxygen-ion conductor are present in amounts to form continuous matrices of alpha-alumina phase and the oxygen-ion conductor phase. This provides two continuous, penetrating networks. Ceramic shapes of 30 to 70 vol. % alpha-alumina and 70 to 30 vol. % oxygen-ion conductor have been generally found suitable. Shapes of a composition outside of these limits may also be suitable if a continuous matrix of both the alpha-alumina and oxygen conductor constituents is present.

The alpha-alumina/oxygen conductor ceramic shape is exposed to the appropriate ion species in the form of an alkali-metal-oxide at an elevated temperature, above about 800° C., preferably between 1200° C. and 1500° C. If the temperature is too low, the rate of reaction is inadequate. If the temperature is too high there can be an evaporation loss of the alkali-metal oxide. Additionally, it is also possible for alkali-metal-beta"-alumina to convert into alkali metal-beta-alumina, especially above about 1600° C.

The vapor contains an oxide of the alkali-metal, preferably as $Na_2O$, if the sodium form is desired, and potassium, preferably as $K_2O$, if the potassium form is required. The vapor also contains a stabilizing ion, preferably as $Li_2O$, MgO, ZnO if the beta"- form is desired. The process of the invention is preferably carried out by embedding the composite shape of alpha-alumina and oxygen-ion conductor in a powder that when heated to reaction temperature produces the appropriate vapor. For example, a powder of alumina and alkali-metal-beta or - beta"-alumina, or a powder of alumina and alkali-metal oxide calcined to form alkali-metal-beta or -beta"- alumina is suitable. Any other suitable process for exposing the composite to alkali-metal vapors is contemplated.

During the process of the invention, oxygen ions transport through the oxygen-ion conductor while sodium ions transport through the already formed alkali-metal-beta- or beta"-alumina. In this manner, rapid paths are provided for both species and the reaction kinetics are not controlled by the rates of diffusion, but primarily by the formation of alkali-metal-beta- or beta"-alumina at the reaction front; that is the boundary separating alpha-alumina (with oxygen-ion conductor) and formed alkali-metal-beta- or beta"-alumina (with oxygen-ion conductor).

The final product is a ceramic composite of the oxygen-ion conductor and the beta-or beta"-alumina. Since no sintering conditions were required to form the beta- or beta"-alumina, there is no formation of liquid phases that compromise the properties of the composite. In addition, the oxygen-ion conductor can be chosen to contribute positively to the physical properties, providing a further enhancement.

DETAILED DESCRIPTION OF THE INVENTION

Compositions of the invention are made by first fabricating an alpha-alumina matrix with an added oxygen-ion conductor. The oxygen conductor may be any suitable oxygen conducting ceramic. The alpha-alumina and the oxygen conductor are present in an amount to provide a continuous matrix of both the alpha-alumina and the oxygen conductor phases.

Figure 1:
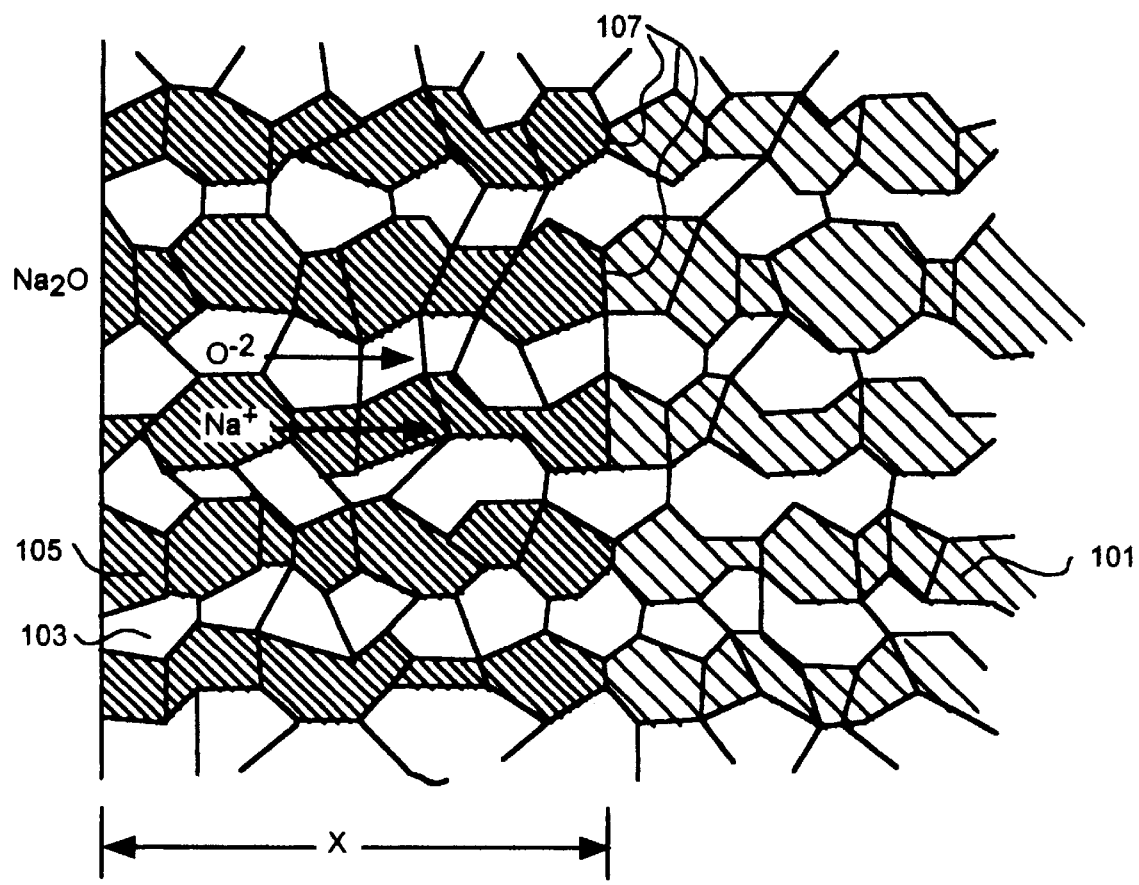
FIG. 1 is a schematic of a cross-section of an alpha-alumina and zirconia composite, showing the conversion process of alpha-alumina to sodium-beta"alumina.

Reference is made to FIG. 1, which is a schematic of a cross-section of an alpha-alumina and an oxygen-ion conductor, zirconia, showing the conversion process of alpha-alumina to sodium-beta"-alumina. Shown is a composite of an alpha-alumina phase 101 and an oxygen-ion conductor or zirconia phase 103. The alpha-alumina phase is converted to sodium-beta"-alumina 105 along a reaction front 107. Sodium ions transport through the sodium-beta"-alumina 105 already converted from alumina, and oxygen ions transport through the zirconia 103. As the reaction proceeds, the reaction front advances and the thickness (X) of the converted alpha-alumina layer increases. While only one surface is shown in FIG. 1, it is understood that in an actual flat or cylindrical plate or film, conversion proceeds from both surfaces. The resulting material is a composite of sodium-beta"-alumina and the oxygen conductor.

Oxygen-ion conductors, such as zirconia, have good strength properties, and accordingly, the resulting composite is rather strong. By practice of the invention, the process of the invention produces dense composite ceramic particularly suitable for electrolytes.

Figure 2:
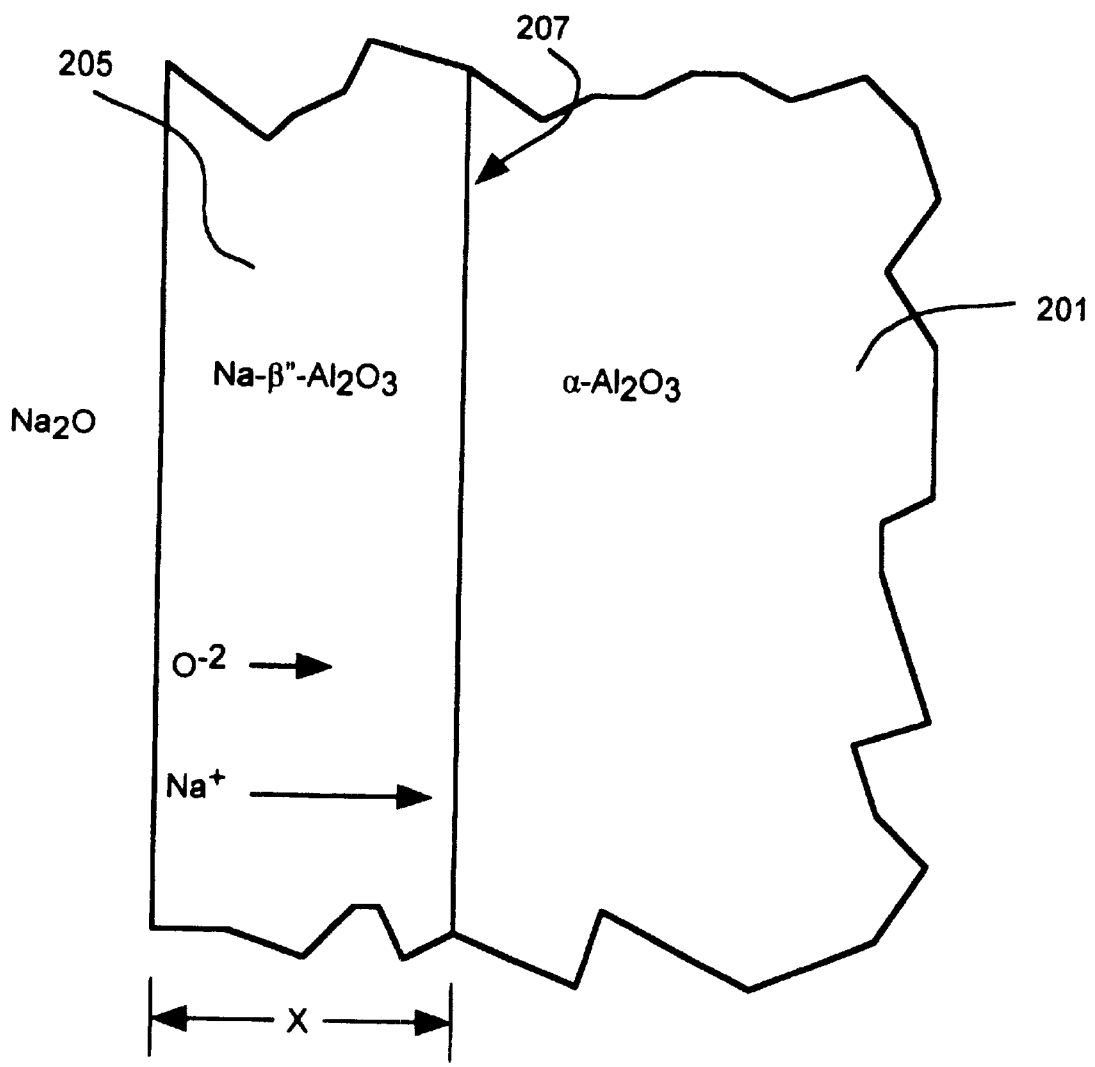
FIG. 2 is a schematic of a cross-section of an alpha-alumina ceramic, showing a prior-art process.

As a comparison, reference is now made to FIG. 2, which is a schematic that shows conversion of a pure alpha-alumina shape without an added oxygen conductor. In this process, both the sodium-ions and oxygen-ions must diffuse to the alpha-alumina phase 201 through the sodium-beta"-alumina 205 already converted from the alpha-alumina. Initially, $Na_2O$ and $Li_2O$ react with the surface $\alpha$-$Al_2O_3$ to form sodium-beta"-alumina. Further growth of sodium-beta"-alumina requires that $Na_2O$ and $Li_2O$ stabilizer be transported through the already formed sodium-beta-alumina and to react with $\alpha$-alumina at a reaction front at the sodium-beta-alumina/$\alpha$-$Al_2O_3$ interface. The $Na_2O$ diffusion occurs by the diffusion of both sodium and oxygen ions (shown by the arrows) through the already formed sodium-beta-alumina to the reaction front 207. Since sodium-beta-alumina is a sodium-conductor, diffusion of sodium-ions is rather rapid. However, the diffusion of oxygen ions is much slower, by orders of magnitude. As a result, the rate of the alpha-alumina conversion is very slow because it is controlled mainly by the slow oxygen diffusion. This contrasts with the present invention, where both the sodium ions and the oxygen ions are quickly transported by rapid diffusion through the respective diffusion networks to the reaction front.

By practice of the present invention the conversion times are much shorter than the prior-art diffusion system, on the order of hours, as compared to days. This introduces a significant advantage into the conversion process.

EXAMPLE I

Compositions of the invention were made using three different oxygen-ion conductors, (1) 8 mol. % $Y_2O_3$-stabilized cubic phase zirconia (8YSZ), (2) 4.5 mol. % $Y_2O_3$-stabilized tetragonal+cubic phase zirconia (4.5YSZ), and (3) rare earth oxide-doped ceria ($CeO_2$).

For the compositions made using zirconia, three types of discs were made: (a) 50 vol. % alpha-alumina+50 vol. % 8YSZ, (b) 70 vol. % alpha-alumina+30 vol. % 8YSZ, and (c) 50 vol. % alpha-alumina+50 vol. % 4.5YSZ. Disc-shaped samples of 2.5 mm thickness of compositions (a), (b), and (c) were fabricated using requisite powder mixtures, die-pressing, followed by isostatic pressing, and then sintering in air at 1600° C. The discs after sintering were placed in a powder mixture containing $Na_2O$ and $Li_2O$. The powder, having a composition; 8.85 wt. % $Na_2O$, 0.75 wt. % $Li_2O$, and 90.45 wt. % $Al_2O_3$, was first calcined at 1250° C. for 2 hours to form sodium-beta-alumina, and served as the source of sodium and lithium oxides during reaction. Samples were maintained at 1450° C. for various periods of time ranging between 2 hours and 16 hours. The samples were cross-sectioned and the thickness of sodium-beta-alumina formed was measured.

Figure 3:
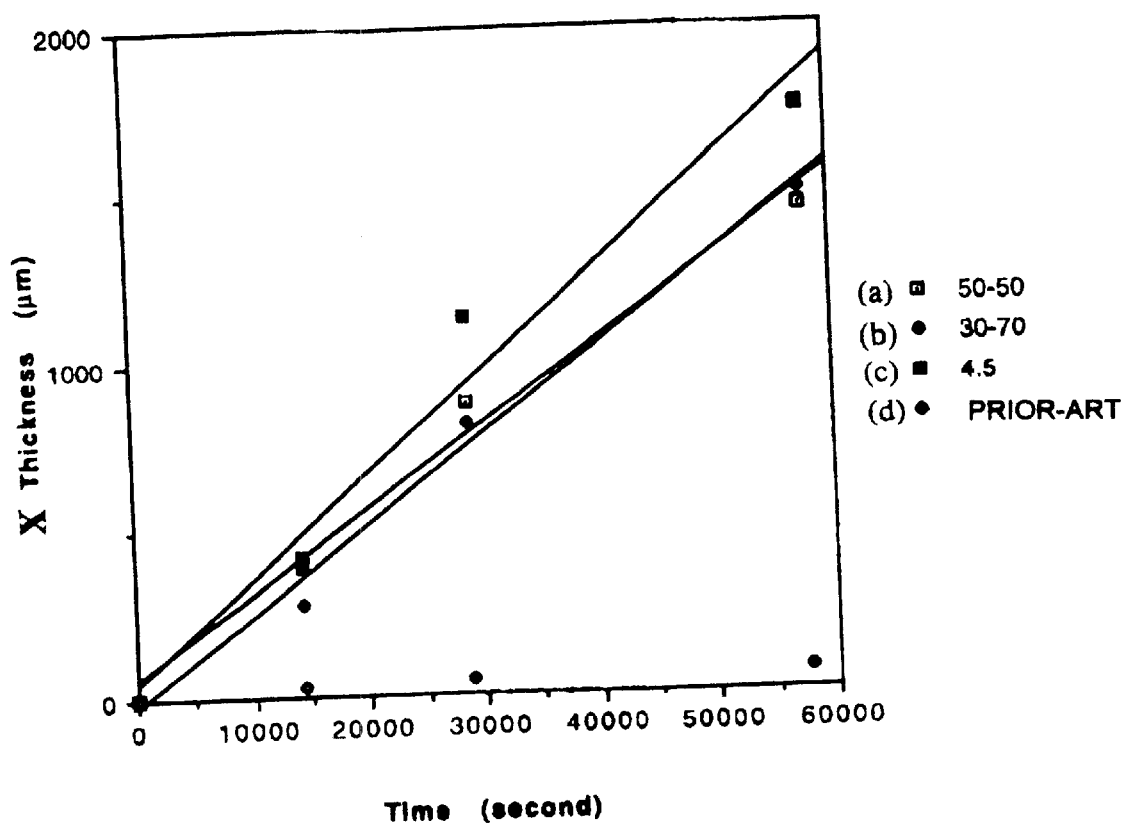
FIG. 3 is a plot of thickness converted, X vs. time, for various samples according to the invention and a comparative sample.

FIG. 3 shows a plot of the thickness measured as a function of time at 1450° C. for three samples of the invention: (a) 50 vol. % alpha-alumina+50 vol. % 8YSZ, (b) 70 vol. % alpha-alumina+30 vol. % 8YSZ, (c) 50 vol. % alpha-alumina+50 vol. % 4.5YSZ. Note that the thickness of the region converted into sodium-beta-alumina is in excess of 1500 $\mu$m (1.5 mm) for samples (a), (b), and (c) when heat-treated for 16 hours.

Figure 4:
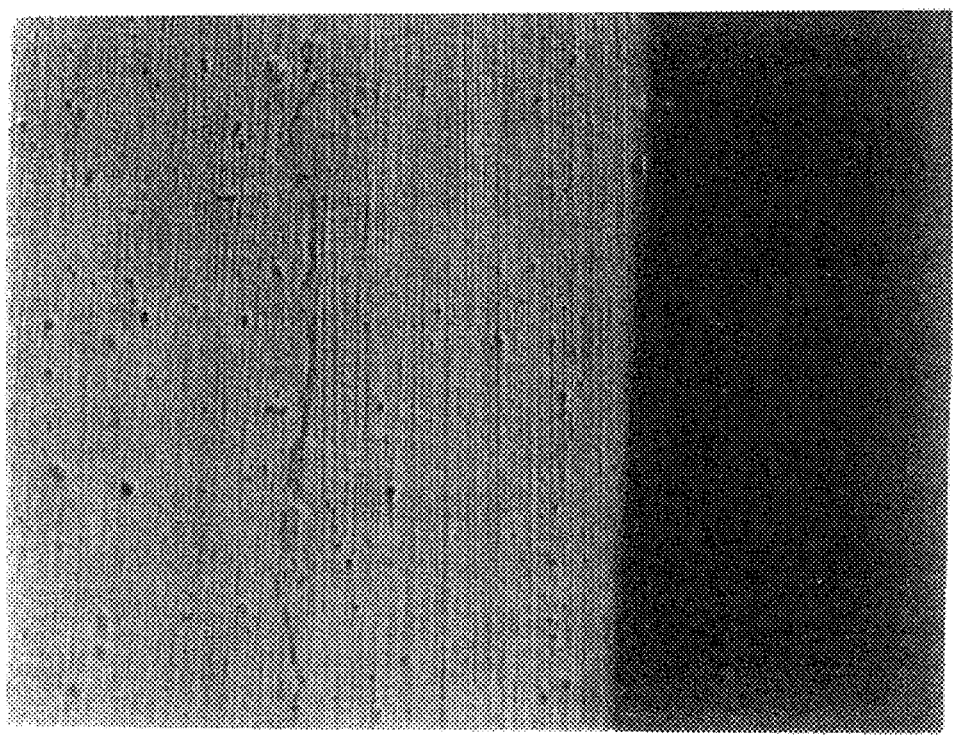
FIG. 4 is an optical micrograph of a sample of a sodium-beta"-alumina/zirconia composite made according to the invention.
Figure 5A:
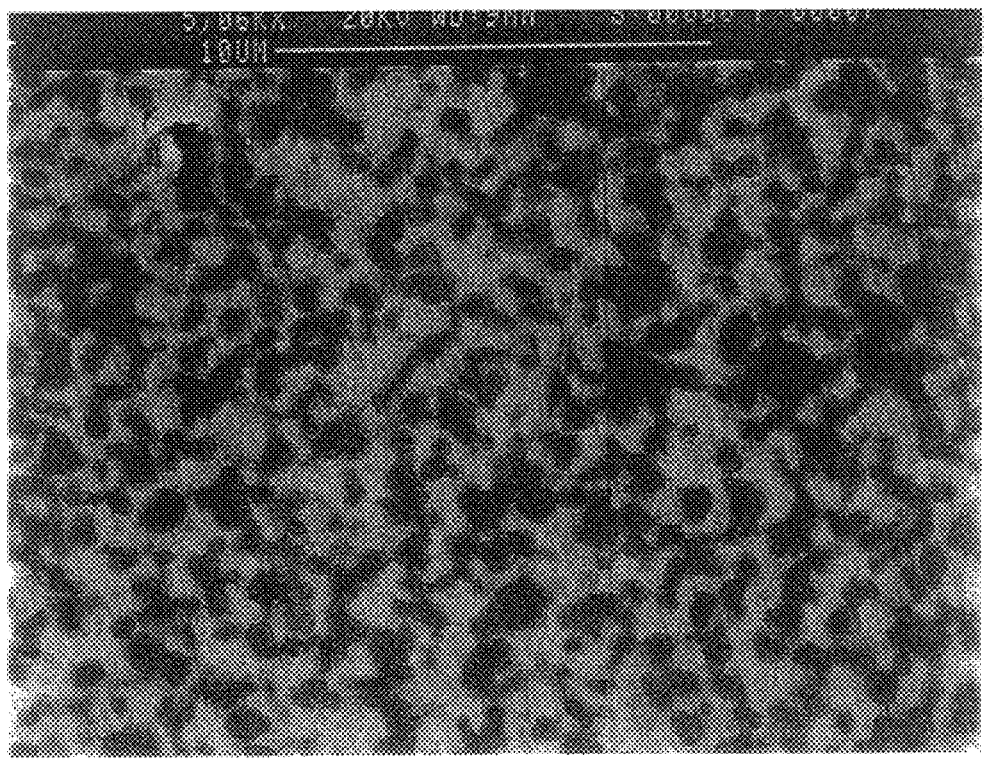
FIGS. 5A and 5B are respectively scanning electron micrographs of an alpha-alumina/zirconia sample, and the same sample after conversion of the alpha-alumina to sodium-beta"-alumina.
Figure 5B:
Figure 6:
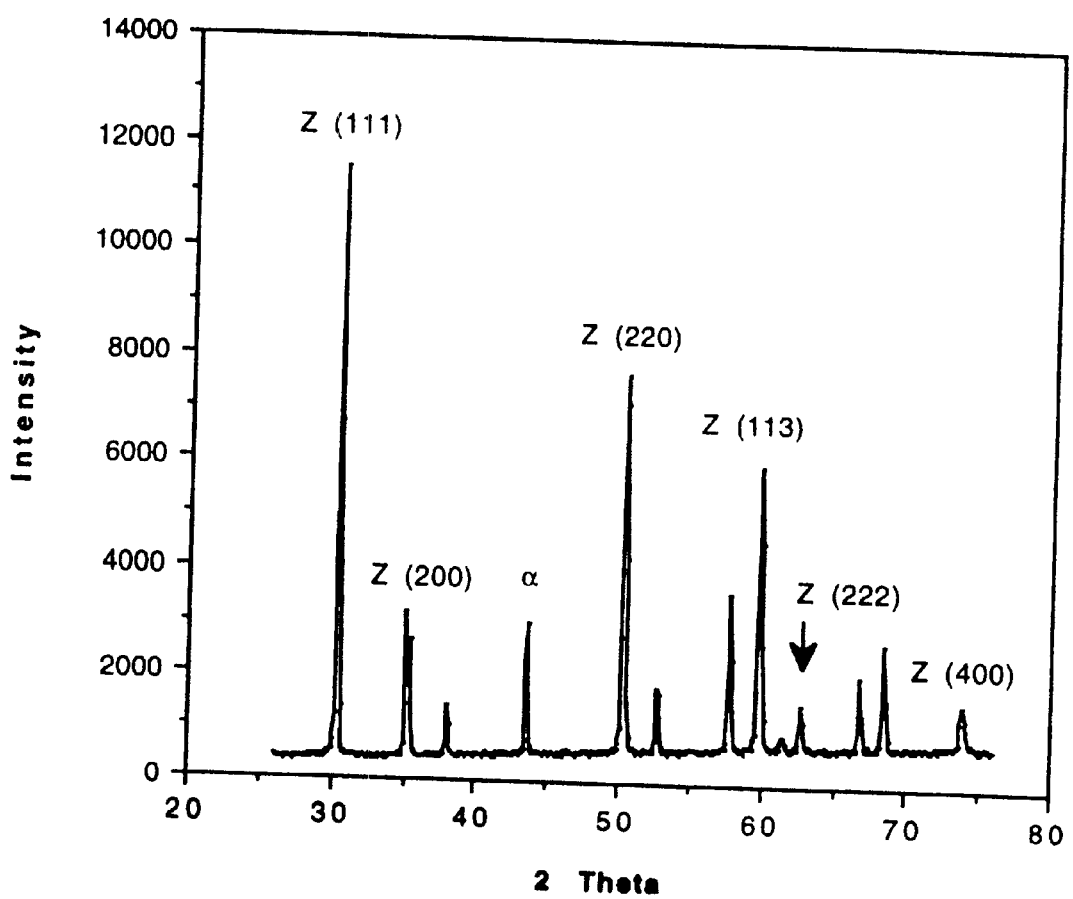
FIGS. 6 and 7 are respectively X-ray diffraction traces of an alpha-alumina/zirconia sample, and the same sample after conversion of the alpha-alumina to sodium-beta"-alumina.
Figure 7:
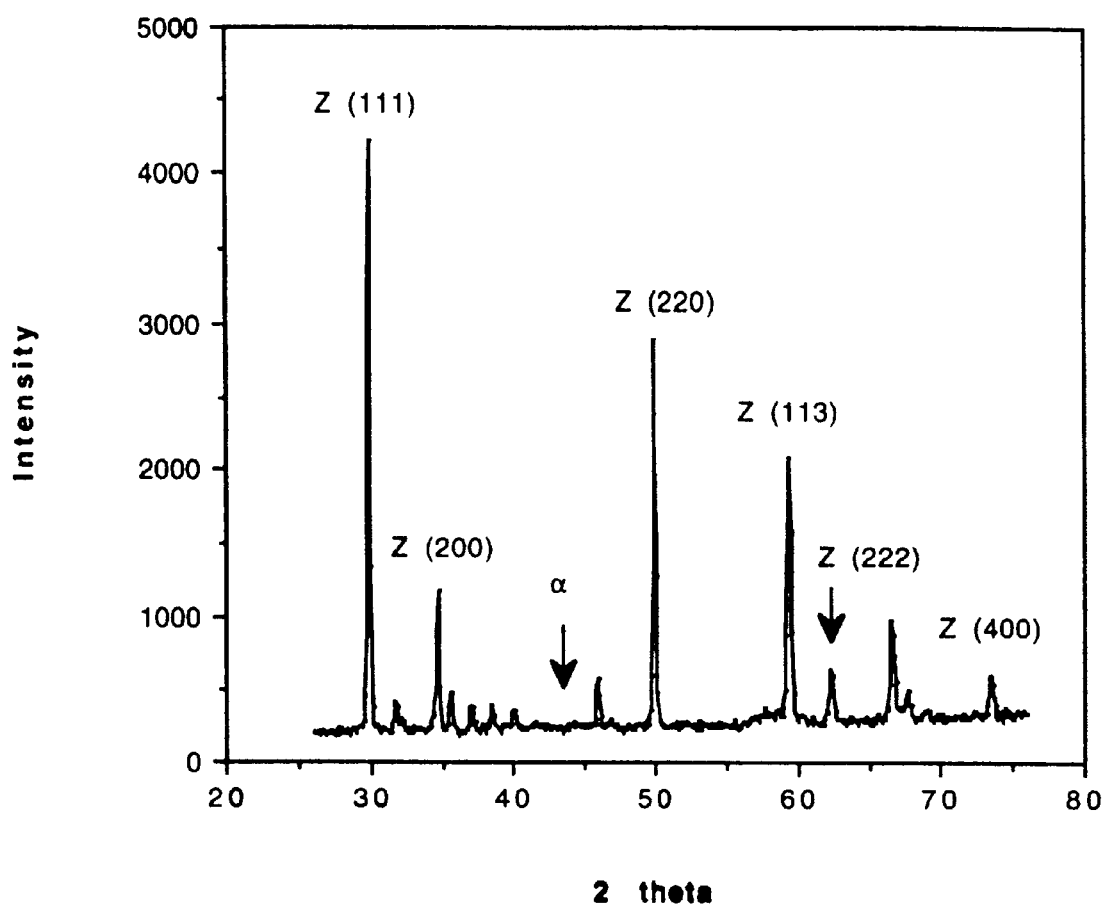

FIG. 4 shows an optical micrograph (50× magnification) of sample (b) after 8 hours at 1450° C. in which the converted thickness is about 820 $\mu$m. FIG. 5A shows a scanning electron micrograph (SEM) of the as-sintered sample (a) before conversion to sodium-beta-alumina. The dark grains are those of alpha-alumina and the light ones are 8YSZ. FIG. 5B shows an SEM micrograph of the same sample after converting $\alpha$-alumina into Na-beta-alumina. The dark grains are those of Na-beta-alumina and the light ones are 8YSZ. FIG. 6 is an X-ray diffraction (XRD) trace of an as-sintered, before-conversion, sample of composition (b) in which peaks corresponding to zirconia (labeled Z) and alpha-alumina labeled ($\alpha$) can be seen. FIG. 7 shows an XRD trace of the sample of composition (b) after heat treatment at 1450° C. for 8 hours. The trace shows peaks corresponding to zirconia (labeled Z) and Na-beta-alumina (unlabeled peaks). No peaks corresponding to alpha-alumina ($\alpha$) can be seen.

Figure 8:
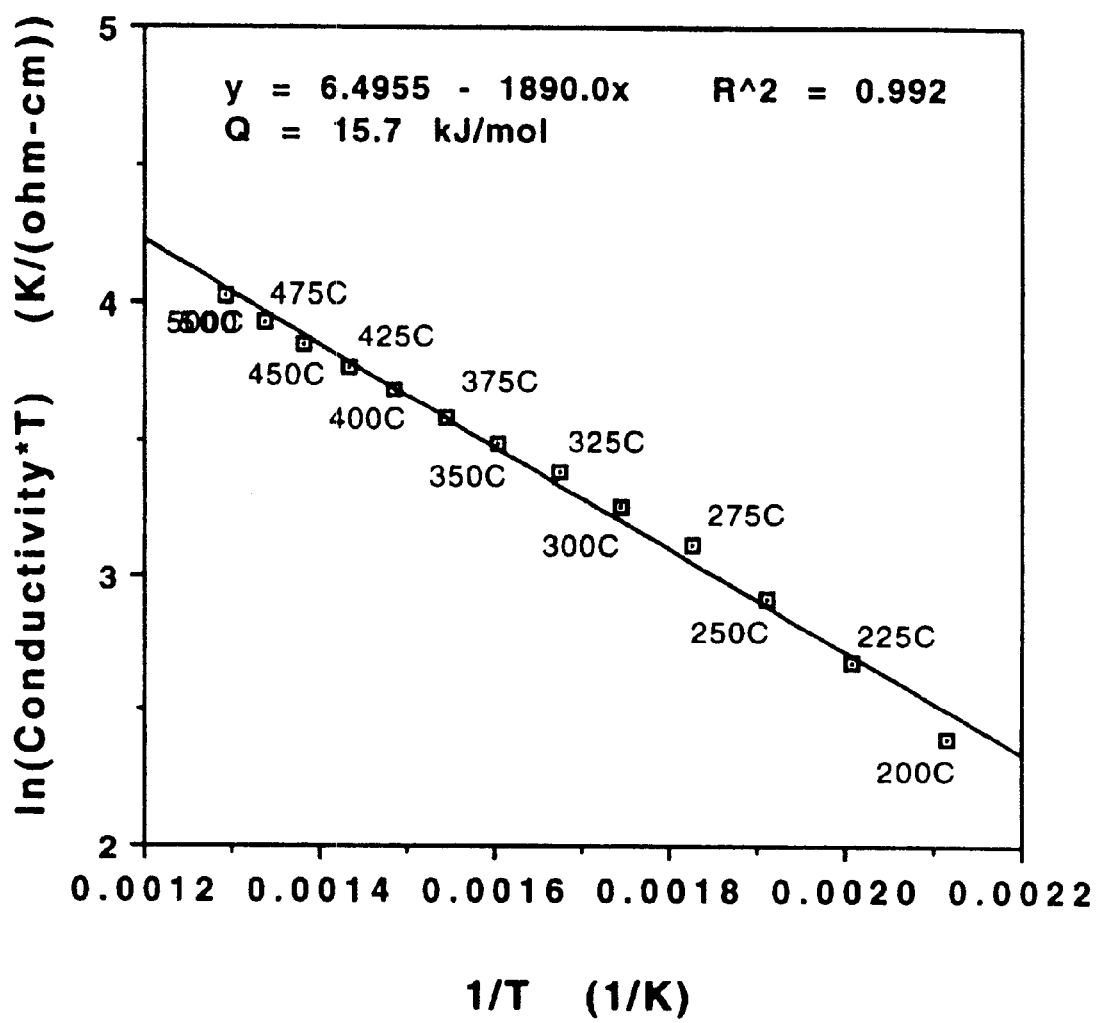
FIG. 8 is a plot of $\ln(\sigma T)$ vs. $1/T$ for a sample according to the invention.

A sample of composition (a) was heat-treated at 1450° C. for a longer time (32 hours) to ensure that it was fully converted into Na-beta-alumina all the way through. Conductivity, $\sigma$, was measured between 200 and 500° C. A plot of ln($\sigma$T) vs. 1/T is shown in FIG. 8. The activation energy was measured to be about 15.7 kJ/mol. Conductivity at 300° C. was 0.0455 S/cm (resistivity of 22 $\Omega$cm). This sample had 50 vol. % zirconia. Also, the grain size of Na-beta-alumina was rather fine (a few microns). The measured $\sigma$ was consistent with expected values for Na-beta-alumina of a fine-grained structure.

Similar results with enhanced kinetics of conversion were also observed with ceria as the oxygen-ion conductor.

EXAMPLE II

Figure 10:
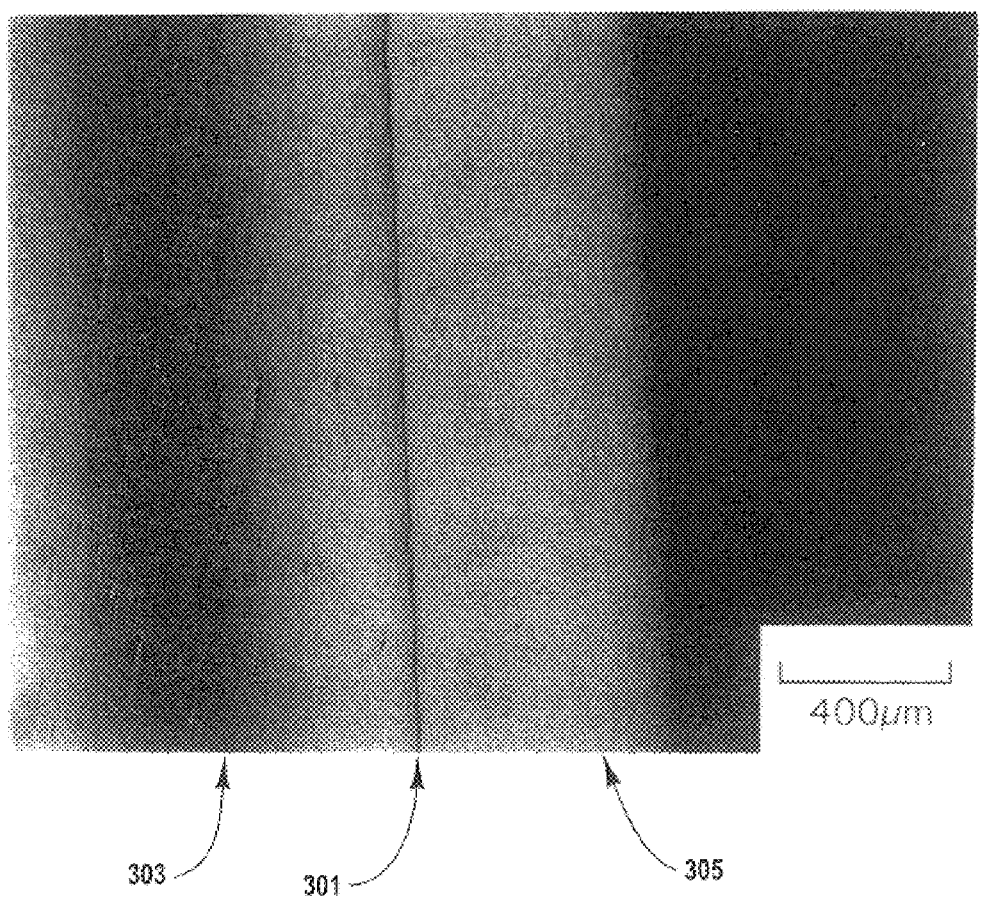
FIG. 10 is a photomicrograph of the partially converted sample of the invention showing the interface between the K-beta-alumina/8YSZ region and the alpha-alumina/8YSZ region.
Figure 11:
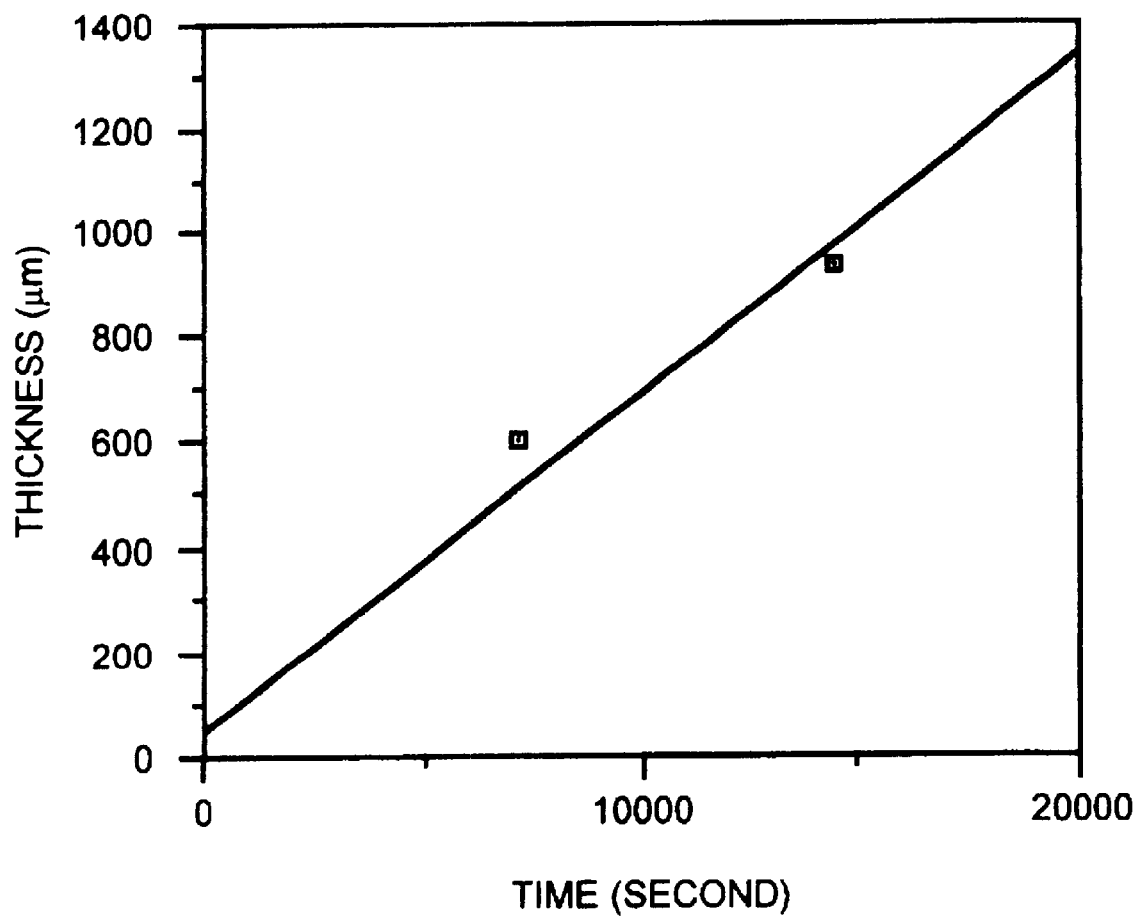
FIG. 11 shows a plot of the thickness vs. time for fabrication of a K-beta-alumina/8YSZ composite of the invention.

A composite of potassium-beta-alumina and YSZ was fabricated according to the method of the present invention. A powder mixture containing 70 vol. % alpha-alumina and 30 vol. % 8YSZ was mixed in ethanol, dried, sieved and pressed into disc-shaped samples. The discs were sintered in air at 1600° C. for 2 hours. Potassium-beta-alumina powder containing $K_2O$: $Al_2O_3$ in 1:5 molar ratio was synthesized by calcining $K_2O$: $Al_2O_3$ powder in 1:5 molar ratio for 4 hours at 1250° C. The discs were embedded in the calcined K-beta-alumina powder and the crucible was heated to 1450° C. Samples were subjected to this heat treatment for 2 and 4 hours. XRD traces taken from the surface of the samples showed that the major phase was K-beta-alumina. FIG. 10 shows a photomicrograph of the partially converted sample showing the interface 301 between the K-beta-alumina/8YSZ region 305 and the alpha-alumina/8YSZ region 303. FIG. 11 shows a plot of the thickness vs. time at 1450° C. Note that in 4 hours the thickness of the converted layer is about 1000 µm (1 mm).

Figure 12:
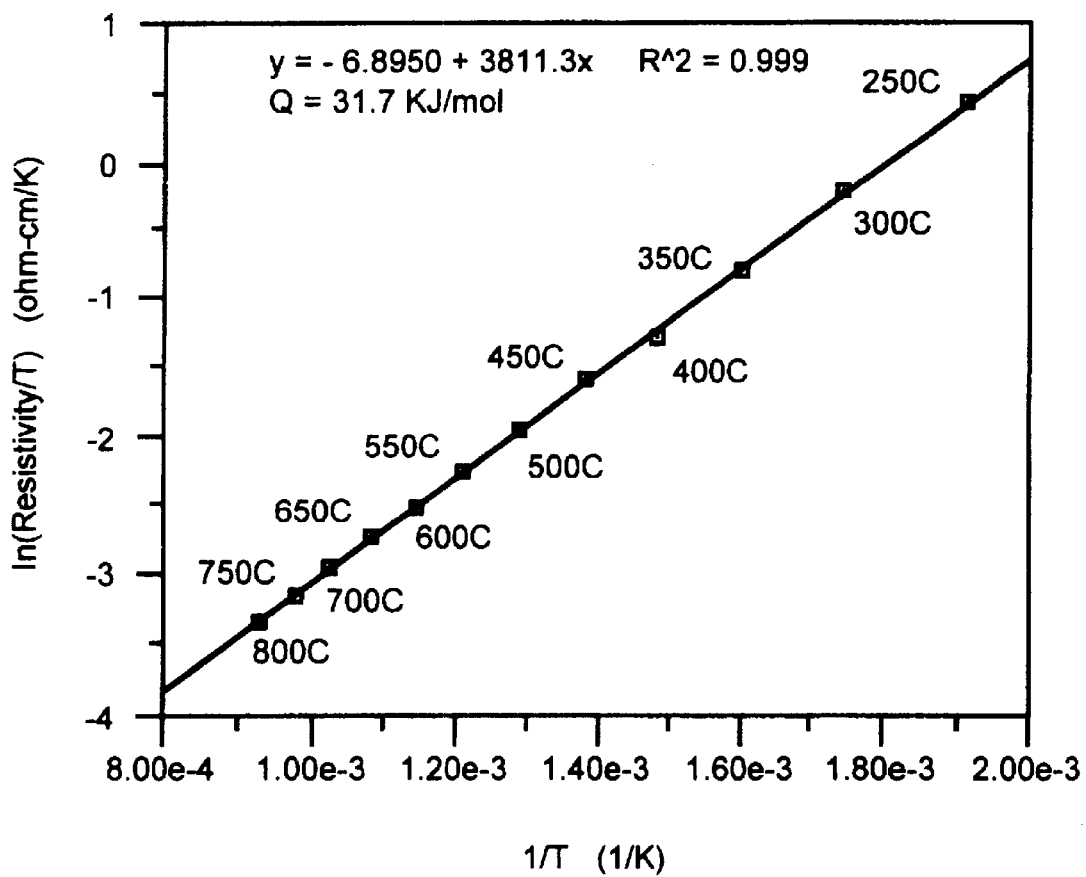
FIG. 12 shows a plot of ln(ρ/T) vs. 1/T for a K-beta-alumina/8YSZ composite of the invention

One disc was subjected to conversion heat treatment at 1450° C. for 12 hours to ensure that the disc was fully converted. Ionic resistivity, ρ, was measured on this sample over a temperature range between 250 and 800° C. FIG. 12 shows a plot of $\ln(\rho/T)$ vs. $1/T$ (T in °K). The activation energy was measured to be about 31.7 kJ/mol. The ionic resistivity, ρ, which is inverse conductivity, 1/σ, at 800° C. was about 38 Ωcm.

EXAMPLE III

Compositions of the invention are made using α-gallium oxide and zirconia by fabricating three types of discs: (a) 50 vol. % α-gallium oxide+50 vol. % 8YSZ, (b) 70 vol. % α-gallium oxide+30 vol. % 8YSZ, and (c) 50 vol. % αgallium oxide+50 vol. % 4.5YSZ. Disc-shaped samples of 2.5 mm thickness of compositions (a), (b), and (c) are fabricated using requisite powder mixtures, die-pressing, followed by isostatic pressing, and then sintering in air at 1600° C. The discs after sintering are placed in a powder mixture containing $Na_2O$ and $Li_2O$ as in Example I. The discs are maintained at 1450° C. for 16 hours to form sodium-beta-gallate. Potassium-beta-gallate is formed in a similar manner using a powder mixture containing $K_2O$ instead of $Na_2O$.

Comparative Example

Figure 9:
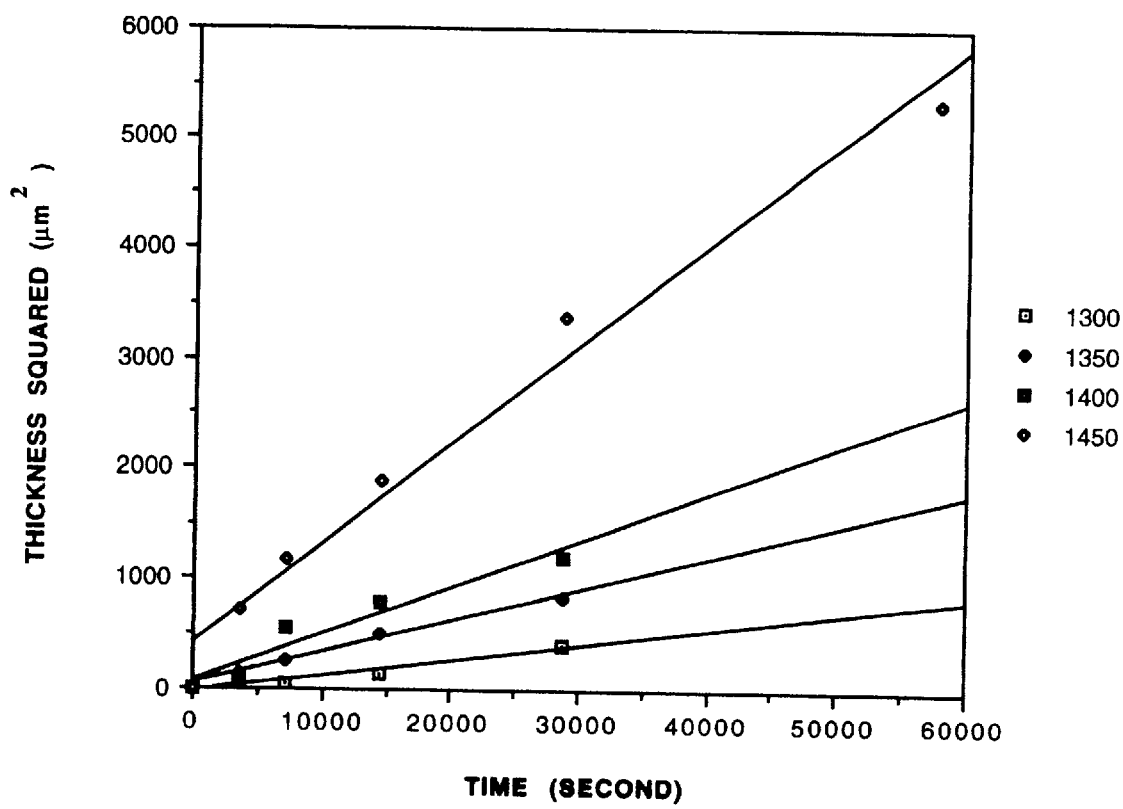
FIG. 9 is a plot of converted thickness squared vs. time of a sample according to the prior-art.

Flat membranes or tubes of α-$Al_2O_3$ made by sintering α-$Al_2O_3$ at 1600° C. for 2 hours were placed inside a zirconia crucible in which was placed a mixture of Na-beta-alumina powder with some excess $Na_2O$. A lid was placed over the crucible and it was heated to a temperature between 1300 and 1450° C., for 1 to 16 hours. The converted thickness squared vs. time is shown in FIG. 9. The activation energy of the conversion process was determined to be 267 kJ/mol. Using this process alpha-alumina sheets of 75 µm thickness can be converted into beta-alumina in 16 hours at 1450° C. Ionic conductivity tests, chemical analysis, and photomicrographs were made and the results were consistent with known properties of Na-beta-alumina.

Referring to both FIGS. 3 and 9, that the present process when compared with the prior-art diffusion process achieves conversion thicknesses that are orders of magnitude greater for the same time. It is worth-noting from FIGS. 3 and 9, that for samples (a), (b), and (c) of the invention, the thickness of converted material, X, varied linearly with time. By contrast, in the case of the comparative sample, the thickness squared is linear with time, indicative of kinetics dictated by diffusion. In FIG. 3 is also shown a plot of a prior-art comparative sample (d) of pure alpha-alumina heat treated for various times up 16 hours at 1450° C. The converted region after 16 hours was only 65 µm thick. This contrasted with samples according to the present invention where the region converted into sodium-beta-alumina under similar conditions was in excess of 1500 µm (1.5 mm). This is because in the comparative sample, the kinetics were limited by slow diffusion of oxygen through Na-beta-alumina.

While this invention has been described with reference to certain specific embodiments and examples, it will be recognized by those skilled in the art that many variations are possible without departing from the scope and spirit of this invention, and that the invention, as described by the claims, is intended to cover all changes and modifications of the invention which do not depart from the spirit of the invention.

What is claimed is:

1. A ceramic composite comprising a continuous phase of an alkali-metal-ion conductor and a continuous phase of a ceramic oxygen-ion conductor, the alkali-metal-ion conductor comprising at least one of alkali-metal-beta-alumina, alkali-metal-beta"-alumina, alkali-metal-beta-gallate, or alkali-metal-beta"-gallate, the phase of the alkali-metal-ion conductor free of sinter-formed grain boundary liquid phase.

2. A ceramic composite as in claim 1 wherein the alkali-metal of the alkali-metal-ion conductor comprises at least one of lithium, sodium, potassium, rubidium or caesium.

3. A ceramic composite as in claim 1 wherein the alkali-metal-ion conductor comprises at least one of sodium-beta"-alumina or potassium-beta"alumina.

4. A ceramic composite as in claim 1 wherein the alkali-metal-ion conductor comprises sodium-beta"-alumina.

5. A ceramic composite as in claim 1 wherein the ceramic oxygen-ion conductor comprises a ceramic comprising at least one of zirconia, ceria, hafnia, or thoria.

6. A ceramic composite comprising a continuous alkali-metal-ion conductor phase of at least one of alkali-metal-beta-alumina or alkali-metal-beta"-alumina and a continuous phase of a ceramic oxygen-ion conductor, the alkali-metal-ion conductor phase free of sinter-formed grain boundary liquid phase.

7. A ceramic composite as in claim 6 wherein the alkali-of the alkali-metal-beta-alumina or alkali-metal-beta"-alumina comprises at least one of lithium, sodium, potassium, rubidium or caesium.

8. A ceramic composite as in claim 6 wherein the alkali metal of the alkali-metal-beta-alumina comprises at least one of sodium or potassium.

9. A ceramic composite comprising a continuous alkali-metal-ion conductor phase of at least one of sodium-metal-beta-alumina or sodium-metal-beta"-alumina and a continuous phase of a ceramic oxygen-ion conductor, the alkali-metal-ion conductor phase free of sinter-formed grain boundary liquid phase.

10. A ceramic composite as in claim 6 wherein the ceramic oxygen-ion conductor comprises a ceramic comprising at least one of zirconia, ceria, hafnia, or thoria.

11. A ceramic composite as in claim 6 wherein the ceramic oxygen-ion conductor comprises a ceramic comprising at least one of yttria stabilized zirconia, rare-earth-oxide-doped zirconia, scandia-doped zirconia, rare-earth oxide doped ceria alkaline-earth oxide doped ceria, stabilized hafnia, or thoria.

* * * * *